(12) United States Patent
Fanourgiakis et al.

(10) Patent No.: US 8,893,372 B2
(45) Date of Patent: Nov. 25, 2014

(54) METHODS FOR INSTALLING AN ANCHOR BOLT

(71) Applicants: George Fanourgiakis, Foster City, CA (US); Henry H. Hamilton, Hillsbourgh, CA (US)

(72) Inventors: George Fanourgiakis, Foster City, CA (US); Henry H. Hamilton, Hillsbourgh, CA (US)

(73) Assignees: George Fanourgiakis, Foster City, CA (US); Henry H. Hamilton, Hillsbourgh, CA (US)

( * ) Notice: Subject to any disclaimer, the term of this patent is extended or adjusted under 35 U.S.C. 154(b) by 0 days.

(21) Appl. No.: 13/850,964

(22) Filed: Mar. 26, 2013

(65) Prior Publication Data

US 2013/0205571 A1    Aug. 15, 2013

Related U.S. Application Data

(62) Division of application No. 12/894,005, filed on Sep. 29, 2010.

(51) Int. Cl.

| | |
|---|---|
| *B23P 19/04* | (2006.01) |
| *B25D 1/02* | (2006.01) |
| *B25B 21/02* | (2006.01) |
| *B25B 31/00* | (2006.01) |
| *B23P 11/00* | (2006.01) |
| *B25D 17/00* | (2006.01) |
| *B23P 19/06* | (2006.01) |
| *B25F 3/00* | (2006.01) |

(52) U.S. Cl.
CPC ............. *B25B 21/02* (2013.01); *B25B 31/00* (2013.01); *B23P 11/00* (2013.01); *B25D 17/005* (2013.01)

USPC ...... 29/525.11; 29/525.02; 173/51; 173/93.6; 81/184; 81/185; 81/177.85

(58) Field of Classification Search
CPC ........... B23P 19/04; B23P 19/06; B25D 1/02; B25F 3/00
USPC .................. 411/55; 29/426.1, 426.5, 525.02, 29/525.01, 525.11; 173/50, 51, 110, 93.6; 81/120, 120.1, 180.1, 184, 185, 81/DIG. 12, 177.2, 124.6, 177.85
See application file for complete search history.

(56) References Cited

U.S. PATENT DOCUMENTS

| | | |
|---|---|---|
| 2,559,558 A | 7/1951 | Carlson et al. |
| 2,638,807 A | 5/1953 | Charles |

(Continued)

OTHER PUBLICATIONS

U.S. Appl. No. 12/894,005, "Final Office Action", mailed Apr. 25, 2013.

(Continued)

*Primary Examiner* — David Bryant
*Assistant Examiner* — Jason L Vaughan
(74) *Attorney, Agent, or Firm* — Kilpatrick Townsend & Stockton LLP

(57) ABSTRACT

A tool assembly for a rotary hammer is provided. The tool assembly includes an adapter and a drive socket removably mounted on the adapter. The adapter has a first end portion configured to be held by a chuck of the rotary hammer and a second end portion that includes a socket square drive fitting on which the drive socket is removably mounted. The socket drive fitting can have any suitable size. For example, the socket drive fitting can be a ¼ inch, a ⅜ inch, a ½ inch, or a ¾ inch square drive fitting.

2 Claims, 5 Drawing Sheets

(56) References Cited

U.S. PATENT DOCUMENTS

| | | |
|---|---|---|
| 2,923,191 A | 2/1960 | Charles |
| 3,054,312 A | 9/1962 | Hans |
| 3,174,597 A | 3/1965 | Schaedler et al. |
| 3,366,187 A | 1/1968 | Von Tersch |
| 3,422,910 A | 1/1969 | Nostrand |
| 3,650,336 A | 3/1972 | Koehler |
| 3,734,515 A | 5/1973 | Dudek |
| 3,861,250 A * | 1/1975 | Zugai ............... 81/464 |
| D245,395 S | 8/1977 | Cognevich |
| 4,098,354 A | 7/1978 | Alcenius |
| D260,355 S | 8/1981 | Buzzell |
| 4,386,882 A * | 6/1983 | Bereiter ............... 411/387.1 |
| 4,408,670 A | 10/1983 | Schoeffler |
| 4,468,826 A * | 9/1984 | Moores, Jr. ............... 7/158 |
| 4,561,507 A | 12/1985 | Liou |
| 4,637,539 A * | 1/1987 | Turcott et al. ............... 227/156 |
| 4,652,193 A * | 3/1987 | Hibbs ............... 411/82.3 |
| 4,750,750 A | 6/1988 | Batalorf |
| 4,794,830 A | 1/1989 | Gross et al. |
| 4,807,349 A | 2/1989 | Blackmore |
| 4,919,216 A | 4/1990 | Ikegami |
| 4,982,625 A * | 1/1991 | Bonner ............... 81/53.2 |
| 5,012,709 A | 5/1991 | Su |
| 5,038,869 A | 8/1991 | Olson |
| 5,083,358 A * | 1/1992 | Jones et al. ............... 29/525.11 |
| 5,085,546 A * | 2/1992 | Fischer ............... 411/55 |
| 5,142,954 A * | 9/1992 | Starke ............... 81/429 |
| 5,213,017 A * | 5/1993 | Jones et al. ............... 81/464 |
| 5,282,638 A | 2/1994 | Harper |
| 5,438,894 A * | 8/1995 | Pearce ............... 81/177.2 |
| 5,526,722 A | 6/1996 | Limehouse |
| 5,568,757 A | 10/1996 | Lewis |
| 5,638,909 A | 6/1997 | Henderson |
| D384,563 S | 10/1997 | Robinson |
| 5,950,507 A | 9/1999 | Wolfe |
| 6,050,157 A * | 4/2000 | Ludwig et al. ............... 81/121.1 |
| 6,174,112 B1 | 1/2001 | Kleine et al. |
| 6,370,993 B1 | 4/2002 | Pitstick |
| 6,481,084 B2 | 11/2002 | Pool et al. |
| 6,609,577 B2 | 8/2003 | Beccu |
| 6,640,914 B2 | 11/2003 | Wisser et al. |
| 6,647,837 B2 | 11/2003 | Liou |
| 6,712,163 B2 | 3/2004 | Kleine et al. |
| 6,742,609 B2 | 6/2004 | Gillis et al. |
| 6,981,496 B2 | 1/2006 | Szendrovari et al. |
| 7,051,628 B2 | 5/2006 | Wilson |
| 7,089,833 B2 | 8/2006 | Hamann et al. |
| 7,185,568 B1 | 3/2007 | Vance |
| 7,374,375 B2 * | 5/2008 | Kleine et al. ............... 408/226 |
| 7,587,873 B2 * | 9/2009 | Mcsherry et al. ............... 52/700 |
| 7,597,155 B2 | 10/2009 | Ullrich et al. |
| 7,814,631 B2 | 10/2010 | Wallek |
| 7,997,169 B1 | 8/2011 | Hack |
| 8,272,299 B2 | 9/2012 | Urick, Sr. |
| 8,607,672 B2 | 12/2013 | Urick et al. |
| 2002/0124371 A1 * | 9/2002 | Livingston ............... 29/275 |
| 2003/0056625 A1 * | 3/2003 | Bizilia et al. ............... 81/177.85 |
| 2008/0008553 A1 * | 1/2008 | Gillis et al. ............... 411/15 |
| 2008/0292421 A1 * | 11/2008 | Lin ............... 411/30 |
| 2008/0292423 A1 * | 11/2008 | Lin ............... 411/31 |
| 2008/0310930 A1 * | 12/2008 | Schaeffer et al. ............... 411/55 |
| 2009/0123251 A1 * | 5/2009 | Dubon ............... 411/20 |
| 2009/0139772 A1 * | 6/2009 | Miyanaga ............... 175/265 |
| 2009/0180839 A1 | 7/2009 | Kardas |
| 2012/0074659 A1 | 3/2012 | Fanourgiakis et al. |

OTHER PUBLICATIONS

U.S. Appl. No. 12/894,005, "Non-Final Office Action", mailed Feb. 15, 2013.

U.S. Appl. No. 12/894,005, filed Sep. 29, 2010, Titled: Tool Assembly and Related Methods.

U.S. Appl. No. 13/850,955, filed Mar. 26, 2013, Titled: Methods for Removing a Fastening Component.

replacementparts.com, Finding the Correct Masonry Drill Bit: SDS, SDS-Plus, SDS Max, and Spline Drive [online] Nov. 19, 2009 [retrieved Apr. 11, 2013] Retrieved from the Internet: <URL: http://www.ereplacementparts.com/article/2120/Finding_the_Correct_Masonry_Drill_Bit_SDS_SDSPlus_SDS_Max_and_Spline_Drive.html>.

The Tool Guru, How to Drill into Concrete [online] Last visited Apr. 10, 2013 [retrieved Apr. 11, 2013 ] Retrieved from the Internet: <URL: http://www.thetoolguru.com/articles/How-to-Drill-Into-Concrete>.

Garage Journal, Forum Topics: SDS Rotary Hammer Drill Accept Regular Bits? [online] First post dated Jul. 14, 2008 [retrieved Apr. 11, 2013] Retrieved from the Internet: <URL: http://www.garagejournal.com/forum/showthread.php?t=20038>.

U.S. Appl. No. 13/850,955, Final Office Action, mailed Feb. 14, 2014.

U.S. Appl. No. 12/894,005, Office Action, mailed Feb. 10, 2014.

U.S. Appl. No. 13/850,955, "First Action Interview Pilot Program Pre-Interview Communication", mailed Nov. 22, 2013.

U.S. Appl. No. 13/850,955, "Notice of Allowance", mailed Jun. 6, 2014.

U.S. Appl. No. 12/894,005, "Final Office Action", mailed Jun. 3, 2014.

\* cited by examiner

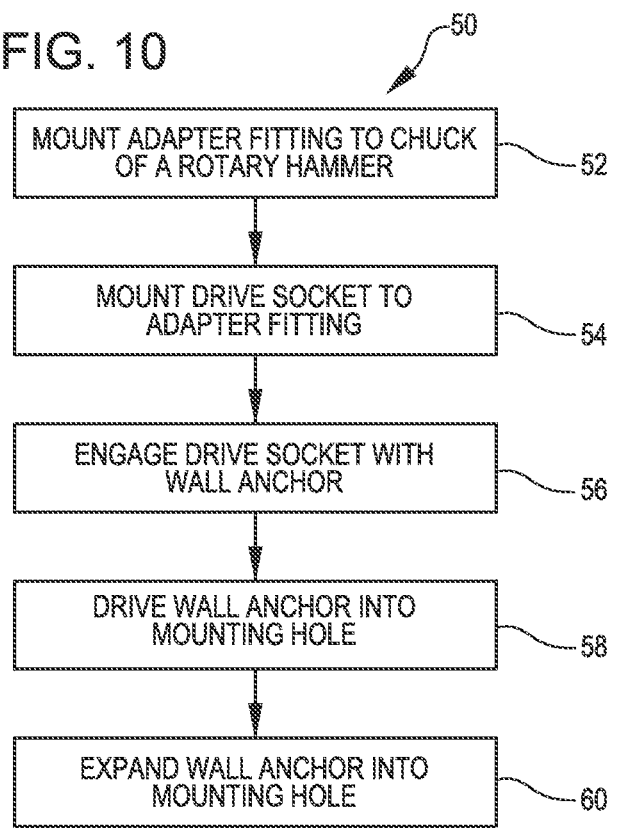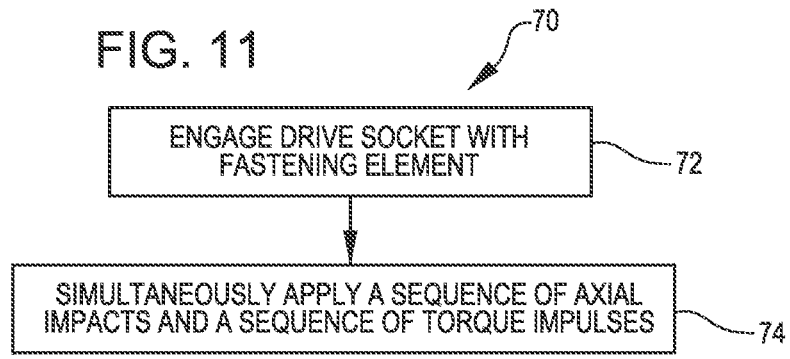

METHODS FOR INSTALLING AN ANCHOR BOLT

CROSS-REFERENCES TO RELATED APPLICATIONS

This application is a divisional of U.S. patent application Ser. No. 12/894,005, entitled "TOOL ASSEMBLY AND RELATED METHODS," filed Sep. 29, 2010, the entire disclosure of which is hereby incorporated herein by reference.

BACKGROUND

The present disclosure provides a tool assembly for use with a rotary hammer and related methods, and methods for removing frozen bolts and/or nuts. The disclosed tool assembly and related methods may be particularly useful for installing an anchor bolt into a hole in a concrete member (e.g., a wall, a floor, a ceiling). And methods disclosed herein may be particularly useful in removing a bolt and/or nut that is frozen in place due to, for example, corrosion.

Internally-threaded anchor bolts are often used to mount a structure to a concrete member. To install an anchor bolt, a hole is drilled into the concrete member to a sufficient depth to accommodate the anchor bolt. Often, the hole diameter is selected to provide a desired interference fit between the hole and the anchor bolt. Such an interference is selected such that the anchor bolt grips the interior of the hole sufficiently to securely support the mounted structure.

As such, it is often necessary to force the anchor bolt into the hole by, for example, a series of impacts. This can be a tedious process due to the hardness of concrete, especially where the process must be repeated to install large numbers of anchor bolts. The use of a hammer to manually insert the anchor bolt can take a large amount of worker time. And when the temperature of the concrete drops between when the hole is drilled and when the anchor bolt is inserted, the resulting contraction of the concrete results in increased interference, which may result in the expenditure of even more worker time to insert the anchor bolt.

Once the anchor bolt is inserted into the hole, the anchor bolt is secured to the hole by expanding the anchor bolt. The expansion of the anchor bolt is accomplished by tensioning an internal member via the rotation of an exterior nut. The tensioning of the internal member results in a radial expansion of a portion of the anchor bolt disposed within the hole, thereby generating increased compression between the anchor bolt and the interior of the hole. Rotating the exterior nut, however, like the insertion of the anchor bolt in the hole, can be a tedious process.

Accordingly, there is a need for improved tool assemblies and related methods for the installation of anchor bolts. Preferably, such tool assemblies should allow for the use of a rotary hammer that is employed to drill the hole into the wall, to insert the anchor bolt into the hole, and to rotate the exterior nut to expand the anchor bolt. And such a tool assembly should be easily engaged with a conventional rotary hammer and provide for the insertion and expansion of the anchor bolt so as to not require removal of the tool assembly from engagement with the rotary hammer between the insertion and the expansion of the anchor bolt.

Additionally, the removal of a bolt and/or nut that is frozen in place by, for example, corrosion, can be difficult. To facilitate the removal of such a frozen bolt and/or nut, an impact wrench is often used. The impact wrench applies repeated torque impulses to the bolt and/or nut. While the application of the repeated torque impulses may be sufficient to remove the bolt and/or nut in many instances, it may be insufficient in other more severe cases, or may result in the threads or external features of the bolt and/or nut being stripped.

Accordingly, there is also a need for an improved apparatus and related methods for removing a frozen bolt and/or nut. Such an improved apparatus and related methods should provide increased functionality and effectiveness relative to the use of an impact wrench to remove a frozen bolt and/or nut.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present disclosure provides a tool assembly for use with a rotary hammer and related methods, and methods for removing frozen bolts and/or nuts. The disclosed tool assembly and related methods may be particularly useful for installing an anchor bolt into a hole in a concrete member (e.g., a wall, a floor, a ceiling). And methods disclosed herein may be particularly useful in removing a bolt and/or nut that is frozen in place due to, for example, corrosion.

Thus, in a first aspect, a tool assembly for a rotary hammer is provided. The tool assembly includes an adapter and a drive socket removably mounted on the adapter. The adapter has a first end portion configured to be held by a chuck of the rotary hammer and a second end portion that includes a socket square drive fitting on which the drive socket is removably mounted.

The adapter can be configured to transfer an axial compression force from the rotary hammer to the socket. The axial compression force is oriented along a direction from the first end portion to the second end portion. The second end portion can include external surfaces shaped to substantially prevent relative axial movement between the adapter and the socket along the direction from the first end portion to the second end portion so as to transfer the axial compression force from the adapter to the socket.

The adapter can have an elongated body between the first and second end portions. The elongated body can be oriented along an elongate axis of the adapter and include an external surface disposed between the first and second end portions that is configured to be held by an operator of the rotary hammer during use. The external surface can include an axial-symmetric surface with a maximum diameter of between 1.0 and 2.5 inches. For example, the external surface can include a cylindrical surface.

The first end portion can include an elongated cylindrical body. The elongated cylindrical body can have one or more elongated recesses configured to be held by the chuck so as to substantially prevent relative rotational movement between the adapter and the chuck. The one or more elongated recesses can include a recess that extends to the end of the first portion. The one or more elongated recesses can include a recess that does not extend to the end of the first portion.

The socket drive fitting can have any suitable size. For example, the socket drive fitting can be a ¼ inch, a ⅜ inch, a ½ inch, or a ¾ inch square drive fitting.

In another aspect, a method for installing an anchor bolt is provided. The method includes mounting an adapter fitting having a socket square drive fitting to a chuck of a rotary hammer, mounting a drive socket to the socket square drive fitting, engaging the anchor bolt with the drive socket, driving the anchor bolt into a mounting hole by driving the adapter fitting and the drive socket with the rotary hammer operating in an axial hammering mode, and rotating the adapter fitting and the drive socket with the rotary hammer operating in a rotation mode so as to secure the anchor bolt within the mounting hole.

The method for installing an anchor bolt can include additional steps. For example, the method can further include constraining the adapter during the driving of the anchor bolt into the mounting hole by a person holding the adapter.

In another aspect, a method for removing a fastening component is provided. The method includes engaging a drive socket with a nut or a fastener head, and, simultaneously, imparting a sequence of axial impacts onto the nut or the fastener head from the drive socket along an axis of rotation of the nut or the fastener head, and imparting a sequence of torque impulses onto the nut or the fastener head from the drive socket about an axis of rotation of the nut or the fastener head.

The method for removing a fastening component can include additional steps. For example, the method can further include coupling the drive socket with a rotary power tool operable to simultaneously impart the sequence of axial impacts and the sequence of torque impulses to the drive socket. The method can include mounting an adapter fitting having a socket square drive fitting to a chuck of a rotary power tool operable to simultaneously impart the sequence of axial impacts and the sequence of torque impulses to the adapter fitting, and mounting the drive socket to the adapter fitting via the socket square drive fitting.

The sequence of axial impacts and the sequence of torque impulses can be coordinated in various ways. For example, the sequence of axial impacts and the sequence of torque impulses can be in phase. The sequence of axial impacts and the sequence of torque impulses can be out of phase. The sequence of axial impacts and the sequence of torque impulses have different frequencies.

For a fuller understanding of the nature and advantages of the present invention, reference should be made to the ensuing detailed description and accompanying drawings.

BRIEF DESCRIPTION OF THE DRAWINGS

FIG. 10 is a simplified block diagram illustrating steps of a method for installing an anchor bolt, in accordance with an embodiment.

FIG. 11 is a simplified block diagram illustrating steps of a method for removing a frozen fastening element, in accordance with an embodiment.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figures 1, 2:
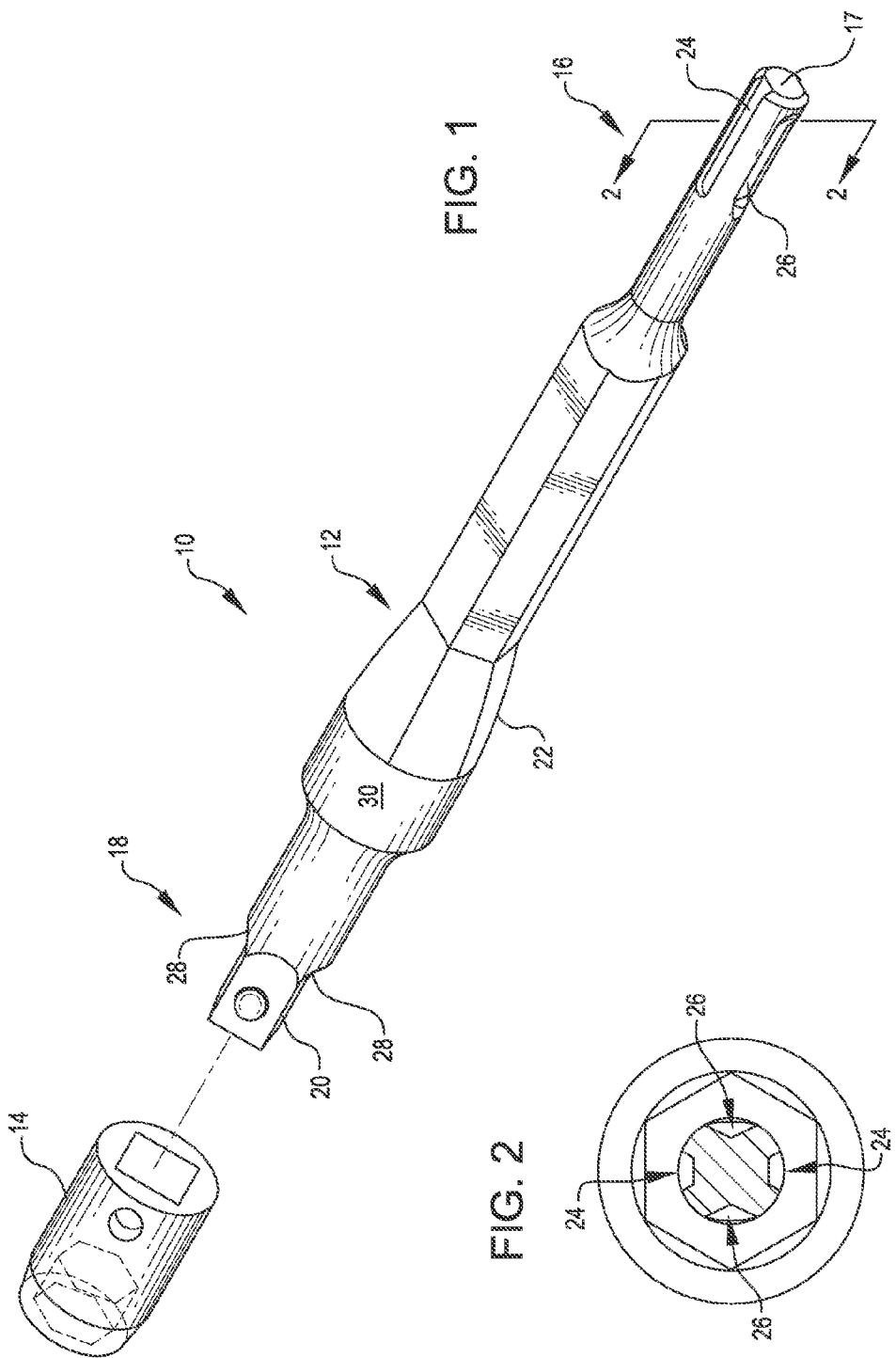
FIG. 1 is an exploded perspective view of a tool assembly for use with a rotary power tool, such as a rotary hammer, in accordance with an embodiment.
FIG. 2 is an end cross-sectional view of the tool assembly of FIG. 1 for section 2-2.

Referring now to the drawings, in which like reference numerals represent like parts throughout the several views, FIG. 1 shows an exploded perspective view of a tool assembly 10, in accordance with an embodiment, for use is a rotary power tool, such as a rotary hammer. The tool assembly 10 includes an adapter 12 and a socket 14. The adapter 12 has a first end portion 16 that is configured to be held by a chuck (e.g., a chuck of a rotary hammer), a second end portion 18 that is configured with a socket square drive fitting 20, and an elongate body 22 between the first and second end portions.

As further illustrated in FIG. 2, the first end portion 16 has a cylindrical body with first recesses 24 and second recesses 26 that are shaped to interface with a chuck so as to substantially prevent relative rotational movement between the adapter and the chuck. The first recesses 24 extend to the end 17 of the first end portion 16, while the second recesses 26 do not. While the first end portion 16 of the present embodiment includes the first and second recesses 24, 26, the recesses are optional. Additionally, the first end portion 16 does not have to be configured as shown, but can be configured in any suitable way to interface with the chuck of a rotary power tool. For example, the first end portion 16 can be configured with an elongated polygonal shape selected to provide a suitable interface with the chuck of a rotary power tool.

In addition to the socket square drive fitting 20, the second end portion 18 includes external surfaces 28 shaped to substantially prevent relative axial movement between the adapter 12 and the socket 14 so as to transfer axial compression force from the adapter to the socket when the tool assembly 10 is used in conjunction with a rotary hammer to drive an anchor bolt into its mounting hole. While the external surfaces 28 illustrated are outwardly flaring curved surfaces, other suitable external surface shapes can be used. For example, a circular flange concentric to the elongate axis of the adapter 12 can be used to interface with the end face of the socket 14 to transfer the axial compression force.

The elongate body 22 connects the first and second end portions 16, 18 and can be hand held during the insertion of an anchor bolt into its mounting hole so as to suitably position the protruding portion of the anchor bolt during the application of the axial impacts used to drive the anchor bolt into its mounting hole. For example, the elongate body 22 includes an external surface 30 configured to be held by an operator of a rotary hammer during use. The external surface 30 has a substantially cylindrical shape and a diameter that is sized to be comfortably hand held. While the external surface can have other suitable shapes and sizes, an axially-symmetric surface may be advantageous if and when the external surface is held during rotation of the tool assembly 10. The maximum diameter of the external surface 30 can be selected within a suitable range to be held. For example, the maximum diameter can range from 1.0 to 2.5 inches. As illustrated, the elongate body 22 can be suitably configured to transition from the first end portion 16 to the external surface 30, and from the external surface 30 to the second end portion 18. Preferably, the elongated body is sized to have sufficient strength and stiffness to prevent breakage of the tool assembly 10 during use.

Figure 3:
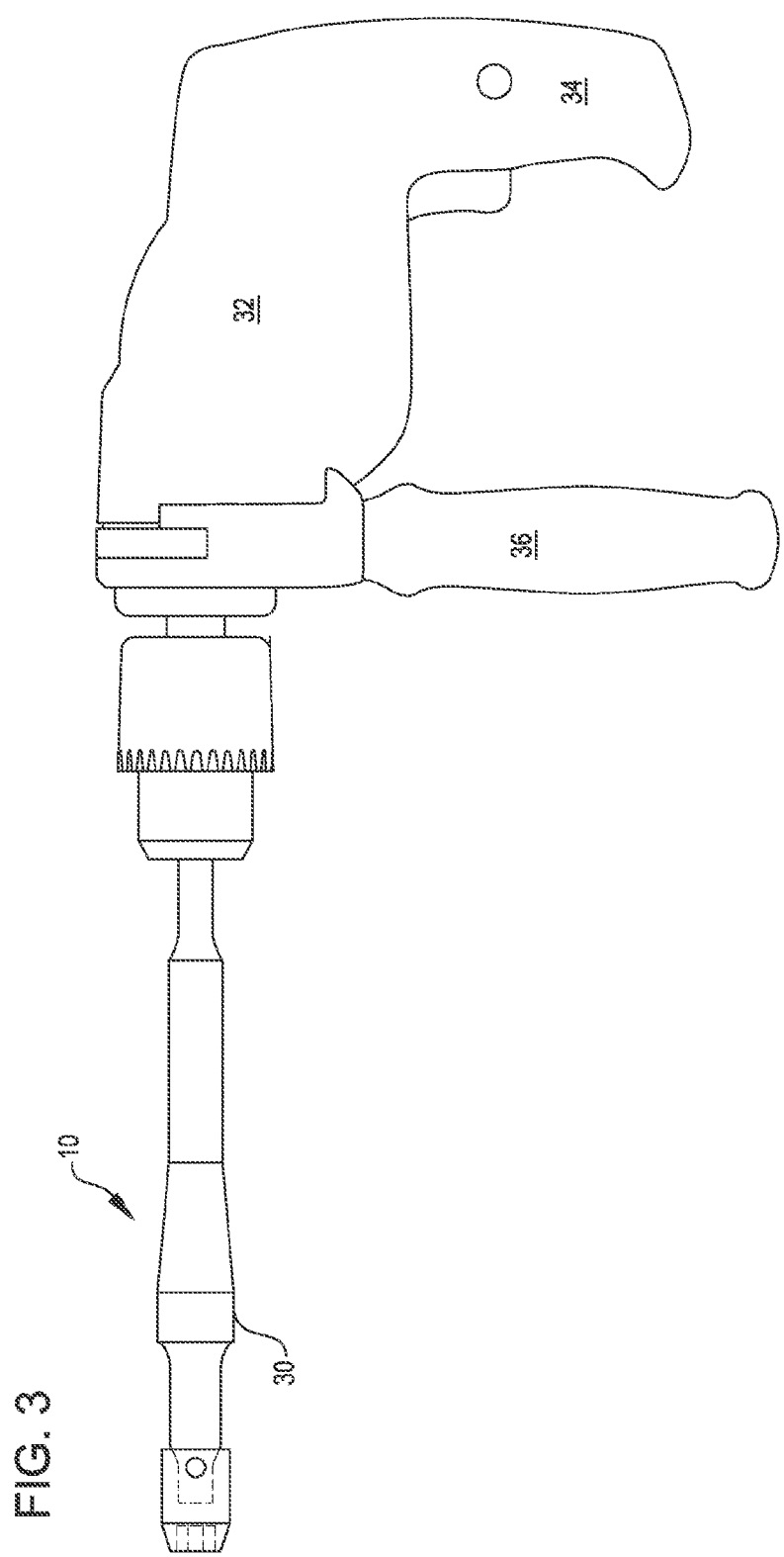
FIG. 3 illustrates the tool assembly of FIG. 1 mounted to a rotary hammer, in accordance with an embodiment.

FIG. 3 illustrates the tool assembly 10 mounted in chuck of a rotary hammer 32. The rotary hammer 32 includes a main handle 34 and an auxiliary handle 36. During use in a hammering mode, the rotary hammer 32 can be used to apply a series of axial impacts to insert an anchor bolt into its mounting hole. When used to insert the anchor bolt, the combination of the rotary hammer 32 and the tool assembly 10 can be held by the main handle 34 in one hand and by the elongate body 22 in the other hand, such as by the external surface 30. Holding the combination rotary hammer and tool assembly in this way may serve to stabilize the position of the anchor bolt during its insertion better than if the user holds onto the combination using the main handle 34 and the auxiliary handle 36. After the insertion of the anchor bolt is complete, the need to stabilize the position of the anchor bolt is eliminated. As such, it may be preferable to hold the combination rotary hammer and tool assembly by the main and auxiliary handles during the expansion of the anchor bolt.

Figure 4:
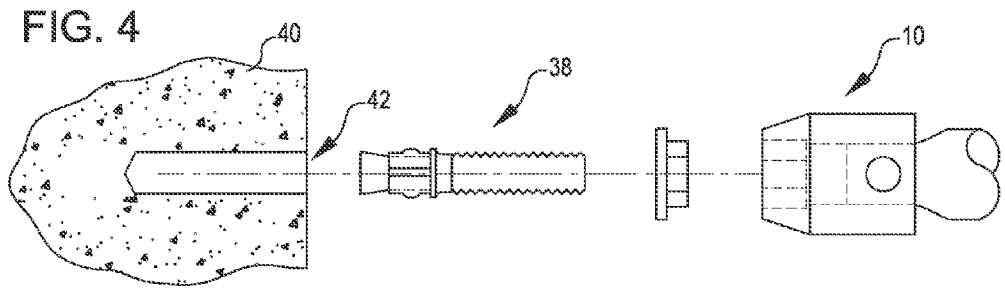
FIG. 4 is an exploded side view illustrating a concrete member having a hole for an anchor bolt, an anchor bolt to be inserted into the hole, and a partial view of the tool assembly of FIG. 1 used to insert and expand the anchor bolt in the hole.
Figure 5:
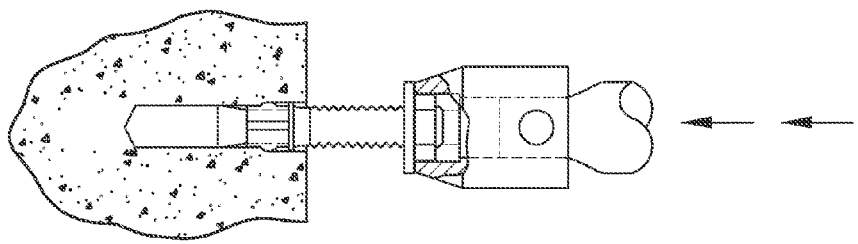
FIGS. 5 and 6 illustrates the anchor bolt of FIG. 4 being inserted into the hole via the use of the tool assembly and rotary hammer of FIG. 3 to apply repeated impacts to the anchor bolt to drive the anchor bolt into the hole.
Figure 6:
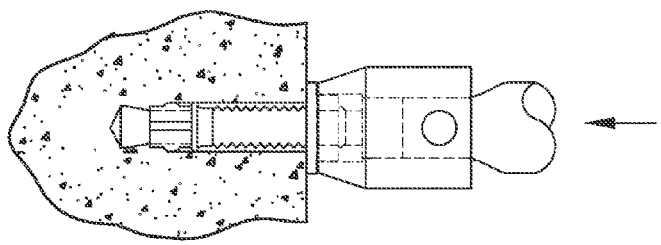
Figure 7:
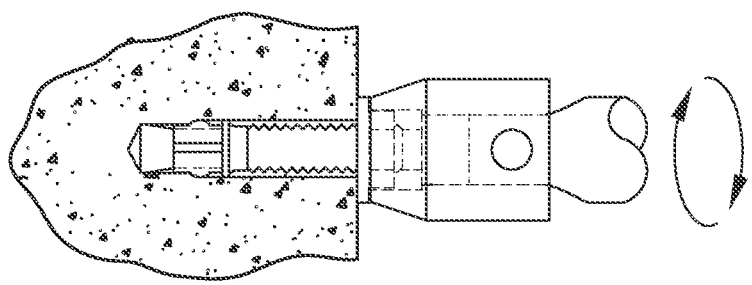
FIGS. 7 and 8 illustrate the use of the tool assembly and rotary hammer of FIG. 3 to rotate the external nut of the anchor bolt of FIG. 4 to tension the internal member, thereby expanding the anchor bolt.
Figure 8:
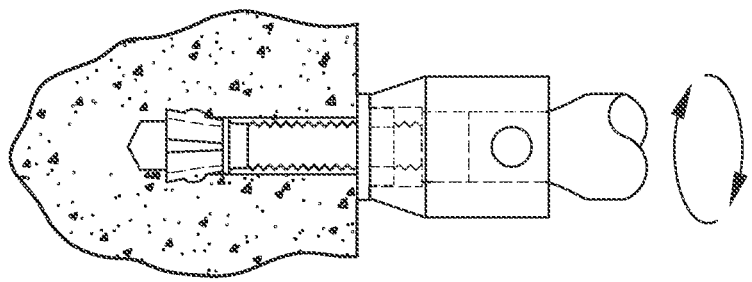
Figure 9:
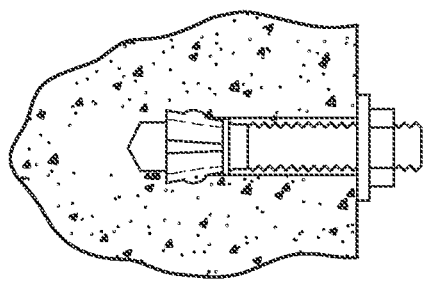
FIG. 9 illustrates the installed and expanded anchor bolt of FIG. 4.

FIGS. 4 through 9 illustrate the installation of an anchor bolt 38 with the use of the combination of a rotary hammer (not shown) and the tool assembly 10 (partially shown). FIG. 4 is an exploded side view illustrating a concrete member 40 having a hole 42 for the anchor bolt 38, the anchor bolt 38 shown prior to insertion into the hole 42, and a partial view of the tool assembly 10. The anchor bolt 38 is inserted into the hole 42 and the combination of the rotary hammer and the tool assembly 10 is used to drive the anchor bolt 38 into the hole 42 via a series of impact forces (rotary hammer in hammer mode) as illustrated in FIGS. 5 and 6. Once the anchor bolt 38 is fully inserted into the hole 42, the combination of the rotary hammer and the tool assembly is used in rotational mode to rotate the nut of the anchor bolt 38, thereby tensioning the internal member and expanding the anchor bolt 38, thereby generating increased compression between the anchor bolt 38 and the interior of the hole 42 as illustrated in FIGS. 7 and 8. The resulting installed anchor bolt 38 is illustrated in FIG. 9.

The tool assembly 10 provides a number of advantages. The tool assembly 10 has a simple configuration that provides an inexpensive and efficient way to use a rotary power tool to install and/or remove fastening elements (e.g., anchor bolts, bolts, nuts). The socket square drive fitting 20 allows the adapter to be coupled with different socket types and/or sizes (e.g., conventional sockets, custom sockets), thereby providing increased flexibility to use the tool assembly 10 to install/remove different fastening elements. The external surface 30 of the adapter 12 provides a convenient location to hold close to the socket 14, which may thereby help to better stabilize an anchor bolt while using a rotary hammer and the tool assembly 10 to insert the anchor bolt into its mounting hole.

Anchor Bolt Installation Methods

FIG. 10 is a simplified block diagram illustrating steps of a method 50 for installing an anchor bolt, in accordance with an embodiment. The tool assembly 10 can be used in practicing the method 50. In step 52, an adapter fitting having a socket square drive fitting is mounted to a chuck of a rotary hammer. In step 54, a drive socket is mounted to the socket square drive fitting. In step 56, the drive socket is engaged with an anchor bolt. In step 58, the anchor bolt is driven into a mounting hole by driving the adapter fitting and the drive socket with the rotary hammer operating in an axial hammering mode. During step 58, the adapter can be constrained by a person holding the adapter so as to stabilize the position of the anchor bolt as it is driven into its mounting hole. In step 60, the adapter fitting and the drive socket are rotated with the rotary hammer operating in a rotation mode so as to secure the anchor bolt within the mounting hole.

Tools and Methods for Removing a Frozen Fastening Component

One known approach for loosening a frozen in place fastening component (e.g., bolt, nut, jar lid) is to subject the fastening component to one or more impacts from one or more directions. Existing rotary hammers are operable to separately and simultaneously apply repeated axial impact forces and a torque. Existing impact wrenches are operable to apply repeated torque impulses. By combining the functionality of a rotary hammer with an impact wrench, a rotary power tool operable to simultaneously apply a sequence of repeated axial impact forces and a sequence of repeated torque impulses can be obtained. The sequences can be staged in any desired fashion. For example, the repeated axial impact forces and the repeated torque impulses can be out of phase (peak values not occurring at the same time) or can be in phase (peak values occurring at the same time). The sequences can also employ the same frequency (resulting in a fixed phase between the sequences) and can employ different frequencies (resulting in a varying phase between the sequences). When such a rotary power tool is equipped with a chuck, the tool assembly 10 can be mounted in the chuck and used to transmit the sequences of axial impacts and torque impulses to the frozen fastening component.

FIG. 11 is a simplified block diagram illustrating steps of a method 70 for removing a fastening element, in accordance with an embodiment. The tool assembly 10 can be used in practicing the method 70. In step 72, a drive socket is engaged with a nut or a fastener head. In step 74, a sequence of axial impacts and a sequence of torque impulses are simultaneously imparted onto the nut or the fastener head. The sequence of axial impacts is imparted onto the nut or the fastener head from the drive socket along an axis of rotation of the nut or the fastener head. And the sequence of torque impulses is imparted onto the nut or the fastener head from the drive socket about an axis of rotation of the nut or the fastener. The method can include coupling the drive socket with a rotary power tool operable to simultaneously impart the sequence of axial impacts and the sequence of torque impulses to the drive socket. The method can include mounting an adapter fitting having a socket square drive fitting to a chuck of a rotary power tool operable to simultaneously impart the sequence of axial impacts and the sequence of torque impulses to the adapter fitting and mounting the drive socket to the adapter fitting via the socket square drive fitting. The sequence of axial impacts and the sequence of torque impulses can be in phase or out of phase. The sequence of axial impacts can have the same or different frequencies.

By combining the functionality of a rotary hammer and a torque wrench, more effective removal of frozen fastening components may result. For example, the resulting simultaneous application of a sequence of axial impacts and a sequence of torque impulses may serve to more effectively break up corrosion holding the fastening element, thereby helping to free up the frozen fastening element so that it can be removed without stripping the threads or external wrenching features of the fastening element.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for installing an anchor bolt, the method comprising:
    providing a rotary hammer having a first mode consisting of axial hammering, a second mode consisting of rotation, and a third mode consisting of axial hammering and rotation;
    mounting to a chuck of the rotary hammer an adapter fitting comprising an elongate shaft terminating at a distal end with a socket square drive fitting and terminating at a proximal end in a cylindrical portion having recesses arranged for receiving protrusions projecting from the chuck of the rotary hammer to couple the cylindrical portion with the chuck so as to mount the adapter fitting to the chuck of the rotary hammer;
    selecting an interchangeable drive socket that has at a distal end a polygonal-shaped opening that corresponds to a size and shape of a head of the anchor bolt, the interchangeable drive socket also having at a proximal end a square opening that corresponds to a size and shape of the socket square drive fitting;
    mounting the interchangeable drive socket to the adapter fitting by engaging the socket square drive fitting with the square opening;
    engaging the anchor bolt with the drive socket by engaging the polygonal-shaped opening with the head of the anchor bolt;
    driving the anchor bolt into a mounting hole by driving the adapter fitting and the drive socket with the rotary hammer operating in axial hammering of the first mode or the third mode; and
    rotating the adapter fitting and the drive socket with the rotary hammer operating in rotation of the second mode or the third mode so as to secure the anchor bolt within the mounting hole.

2. The method of claim 1, further comprising constraining the adapter during the driving of the anchor bolt into the mounting hole by a person holding the adapter.

* * * * *